Feb. 14, 1961 — E. TOMKOW — 2,971,366
GAGE CALIBRATION DEVICE
Filed Sept. 27, 1957
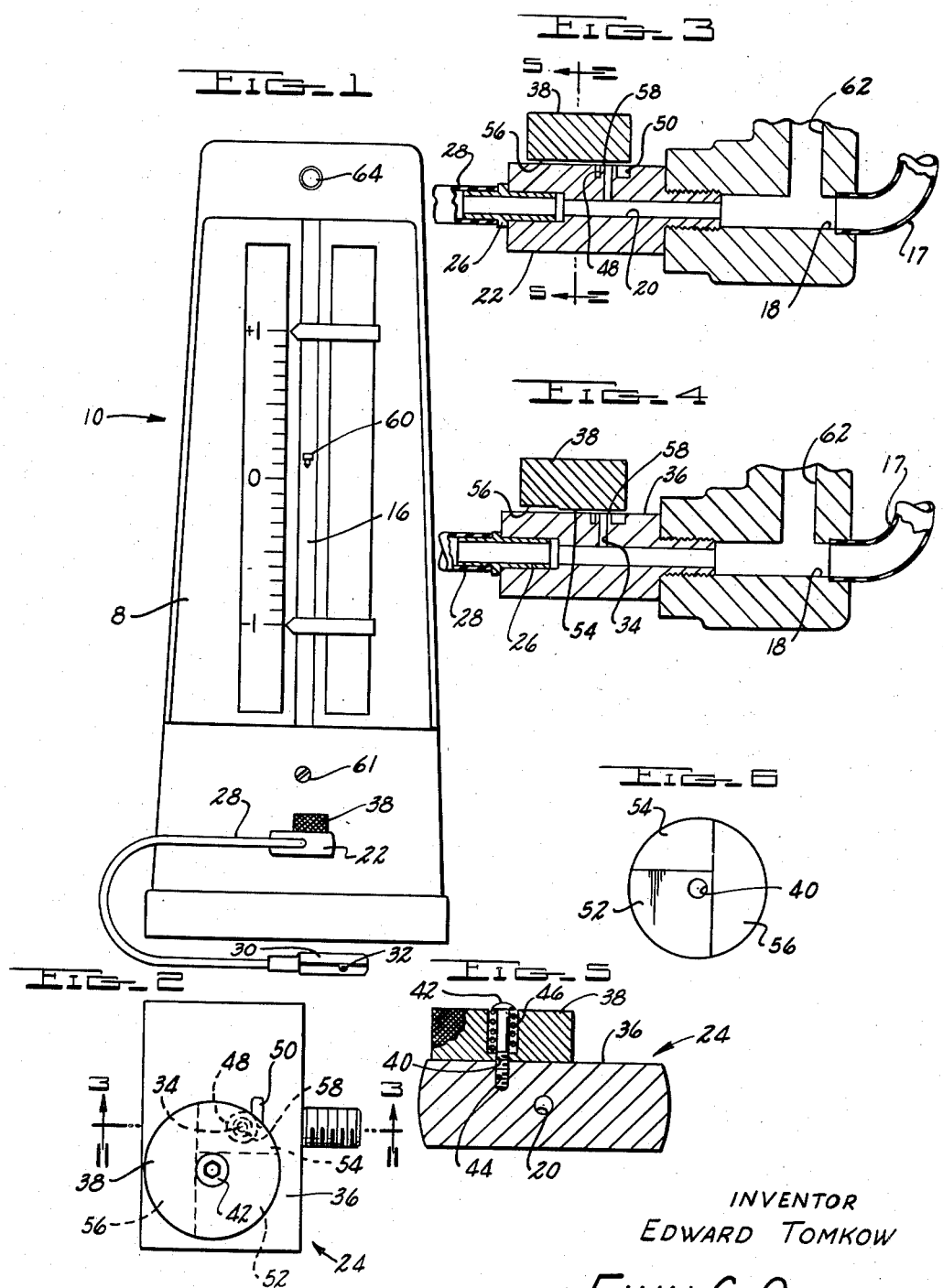
INVENTOR
EDWARD TOMKOW
FINN G. OLSEN
ATTORNEY

United States Patent Office 2,971,366
Patented Feb. 14, 1961

2,971,366
GAGE CALIBRATION DEVICE

Edward Tomkow, Dearborn, Mich., assignor to Dearborn Gage Company, Dearborn, Mich., a corporation of Michigan Filed Sept. 27, 1957, Ser. No. 686,760

14 Claims. (Cl. 73—3)

This invention relates generally to fluid leakage devices for measuring parts dimensions, and more particularly to mechanism for calibrating such fluid leakage devices.

Objects of the invention are, singly and collect.vely, to provide gage calibration mechanism wherein:

(1) The calibration mechanism may be easily put to use for calibration purposes by a quick simple manual adjustment, thereby permitting calibration whenever deemed necessary dur.ng use of the fluid leakage device.

(2) The calibration mechanism is provided with a set of master gage surfaces within its structure, thereby eliminating the need for more than one master gage element, (3) The calibration mechanism may be operatively incorporated at an easily accessible point remote from the work-contact.ng gage element, (4) The calibration mechanism may be used in co-operation with any type gage element, irrespective of the gage element size or contour.

Other objects of this invention will appear in the following description and appended claims, reference being had to the accompanying draw.ngs forming a part of this specification wherein like reference characters designate corresponding parts in the several views.

In the drawings:

Figure 1 is a front elevation of a measuring instrument embodying one form of the present invention;

Figure 2 is an enlarged top plan of the calibrator means of the present invention;

Figure 3 is an enlarged section taken on the line 3—3 of Figure 2;

Figure 4 is a view similar to that of Figure 3 with the calibrator means in a different operative posit.on;

Figure 5 is a section on the line 5—5 of Figure 3; and

Figure 6 is a bottom plan view of a portion of the calibrator means.

Before explaining the present invention in deta.l, it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

In the drawings there is shown a conventional fluid leakage device 10 which includes a housing 8 within which is contained a float chamber or column 16. The upper end of column 16 is connected by suitable tubing 17 to a passageway 18, which in turn leads to a passageway 20 formed in wall member 22 of calibrator means 24. The outlet end of passageway 20 fixedly mounts a tubular fitting 26 which has attached thereto a length of plastic tubing 28. Tubing 28 leads to a conventional gage element 30 having a metering orifice 32.

Passageway 20 communicates with a passageway 34 which leads to a metering surface 36 on wall member 22. Wall member 22 co-operates with a second opposed wall member 38 to form the aforementioned calibrator means 24. Member 38 is provided with a counter-bored opening 40 which receives a screw 42. Screw 42 is turned into a threaded bore 44 in member 22, and a compression spring 46 is positioned within the counterbore to resiliently maintain member 38 against member 22. Screw 42 is thereby fixedly anchored in member 22, and member 38 is free to be manually rotated around the axis of the screw. Spring 46 serves to prevent any movement of member 38 away from member 22 such as might enable undes.red fluid leakage to take place through passageway 34; at the same time spring 46 maintains such a controlled frictional pressure between members 22 and 38 that member 38 is enabled to move freely on member 22 when it is turned manually. The face of member 38 is knurled to permit easy non-slip manual engagement.

Wall member 22 is provided with an annular groove 48 in its metering surface 36 which annular groove 48 surrounds the outlet of passageway 34. Groove 48 leads to another groove 50 wh.ch communicates with the atmosphere. Wall member 38 is provided with three surface sections 52, 54 and 56. Section 52 rides directly against surface 36; when member 38 is positioned with surface section 52 thereof overlying passageway 34 there is no fluid flow from passageway 20 through passageway 34. Section 54 is recessed a slight d.stance above section 52, and section 56 is recessed a slight distance above section 54. When member 38 is positioned with surface 54 thereof overlying passageway 34 there is a slight fluid flow from passageway 20, through passageway 34, past the annular surface 58 (formed on surface 36), into groove 48, and out through groove 50; this slight flu d flow causes a slight raising of float 60 from the bottom of column 16. When member 38 is positioned with surface 56 overlying passageway 34 there is a greater fluid flow past annular surface 58, with a correspondingly greater raising of float 60 in column 16.

When member 38 is so posit.oned that surface 52 closes passageway 34 calibrator mechanism 24 is inoperative, and gage element 30 is effective for measuring purposes. In this closed position fluid flow from a suitable source (not shown) flows upwardly in column 16, past float 60, downwardly through tubing 17, through passageways 18 and 20, through tubing 28, and out through the metering or.fice 32 in gage element 30. The size of the work will determine the cross-sectional area of the fluid path defined by orifice 32, and the consequent volumetric flow or leakage through element 30. This leakage determines the position of float 60 in column 16. The greater the leakage through element 30 the higher will be the position of the float in column 16.

Housing 8 has mounted thereon an adjustable by-pass valve 61 which serves to by-pass fluid flow from the source around column 16 into a passageway 62 wh.ch interconnects with passageway 18. The action of valve 61 is such as to vary the float "amplification," i.e. the vertical distance traveled by the float in response to differences in parts dimensions. In the interest of accuracy it is desirable that the float travel a max.mum distance up and down in column 16 when maximum sized parts and minimum sized parts are being tested; i.e. that a maximum column length be used in the gaging operation.

In order to position the float in its desired position without substantially affecting "float amplification" there is provided a relief valve 64 which serves to exhaust some of the pressure fluid from column 16 to the atmosphere so as to vary the pressure above the float and thereby control its position in the column.

Changes in operat.ng conditions will vary the "float amplification" and "float position" so as to cause errors in the gaging operations. It is desirable therefore that mechanism be provided for testing the "float amplification" and "float position" factors so as to permit suitable adjustment of valves 61 and 64 for correction purposes. Mechanism 24 is designed as such a testing mechanism.

In operation of mechanism 24, when flow through tubing 28 is discontinued by manual squeezing thereof or other suitable method (such as the use of pinch clamp means or valve means not shown), total pressure fluid from passageway 20 is directed into passageway 34. By manually turning wall member 38 so as to position surface 54 directly over passageway 34 a metered flow of fluid will take place past annular surface 58. The spacing between surfaces 54 and 58 (as determined by the amount of "recess" of surface 54 above surface 58) is initially calculated in such a manner that the annular flow path over surface 58 is equivalent to that from orifice 32 when element 30 is used with a work piece having a dimension at the permissible minimum tolerance limit. Thus, when fluid is flowing over surface 58 the float 60 should take a "calibrated" position adjacent the lower end of column 16. If float 60 does not take such a position relief valve 64 can be adjusted to put it in its desired "calibrated" position.

By manually turning wall member 38 so as to position surface 56 directly over passageway 34 (as shown in Fig. 2) the metered flow of fluid over surface 58 can be increased in accordance with the spacing between surfaces 56 and 58. This spacing is initially calculated (i.e. before construction of mechanism 24) in such a manner that the annular flow path between surfaces 56 and 58 is equivalent to that from orifice 32 when element 30 is used with a work piece having a dimension at the maximum tolerance limit. When fluid is flowing between surfaces 56 and 58 float 60 should take its calibrated position adjacent the upper end of column 16. If float 60 does not take such a position relief valve 64 and by-pass valve 61 can be adjusted to put it in its desired calibrated position. Suitable back and forth movement of member 38 can be employed to quickly test for "float amplification" and "float position." Surface 54 simulates the minimum tolerance limit and surface 56 simulates the maximum tolerance limit so as to permit float calibration without actually removing element 30 from its position adjacent the work.

It is contemplated that mechanism 24 can be provided with any number of metering surfaces so as to permit any desired set of "tolerance value" calibrations while still permitting use of the full column length for measuring purposes. The type of indicating mechanism can of course be varied as desired; for example, either the "flow meter" type indicating mechanism as shown in Fig. 1 of the instant drawings or a "back pressure" type indicating mechanism as shown in U.S. Patent No. 1,971,271 can be employed.

Preferably, mechanism 24 is located in an easily accessible position directly in front of the indicating mechanism as shown in Fig. 1 of the drawings, but it could be operatively positioned at other locations.

I claim:

1. The combination comprising a gaging element having a metering orifice therein, conduit means in communication with said metering orifice and adapted to receive fluid under pressure from a pressure source, indicator means responsive to fluid pressure in said conduit means for indicating the amount of fluid flow through said metering orifice, and calibrator means for said indicator means, said calibrator means including first and second wall members having opposed fluid metering surfaces of known spacing, and a passageway open to one of said metering surfaces and extending through one of said wall members into fluid communication with said conduit means downstream of said indicator means, said conduit means containing a portion between said calibrator means and said metering orifice adapted to be closed for interrupting flow of fluid downstream of its place of fluid communication with said passageway, whereby when said portion is closed and fluid is caused to flow from said conduit means through said passageway to the space between said fluid metering surfaces an indication is obtained on said indicator means which indication permits adjustment of the pressures in said conduit means to obtain a calibrated reading on said indicator means.

2. The combination of claim 1 wherein the wall members are mounted for movement relative to one another to change selectively the spacing between said metering surfaces in accordance with different calibrating functions.

3. The combination of claim 1 wherein the metering surface on one of the wall members includes a plurality of surface sections at different distances from the metering surface on the other wall member.

4. The combination of claim 1 wherein the wall members are mounted for movement relative to one another in directions parallel to the opposed metering surfaces.

5. The combination of claim 1 wherein an annular groove is formed in said one metering surface, said groove surrounding the open end of the aforementioned passageway but spaced therefrom whereby to permit escape of fluid from the space between the metering surfaces.

6. The combination of claim 1 wherein the wall members are mounted for movement relative to one another in directions parallel to the opposed metering surfaces, the metering surface of said one wall member being located in a single plane, the metering surface of the other wall member including three parallel surface sections at different distances from the metering surface of said one wall member, one of said surface sections lying against the one wall member metering surface, whereby when said one surface section is in registry with the aforementioned passageway fluid flow through the passageway is prevented.

7. A gage calibration device having a first passageway adapted to be inserted into the fluid discharge circuit of a fluid flow measuring instrument, said device comprising first and second wall members having opposed flat fluid metering surfaces, said wall members being mounted for movement relative to one another in directions parallel to the metering surfaces, a passageway extending from one of said metering surfaces through said first wall member to said first passageway, the metering surface on the second wall member including a plurality of surface sections at different distances from the metering surface on the first wall member.

8. A gage calibration device having a first passageway adapted to be inserted into the fluid discharge circuit of a fluid flow measuring instrument, said device comprising first and second wall members having opposed flat fluid metering surfaces, a second passageway extending from said first passageway through said first wall member to one of the metering surfaces, the second wall member having a first surface section lying against said one metering surface and a second surface section spaced from said one metering surface, said wall members being mounted for movement relative to one another from a position wherein the first surface section registers with the second passageway to a position wherein the second surface section registers with the second passageway.

9. The combination of claim 8 wherein an annular groove is formed in said one metering surface, said groove surrounding the second passageway but spaced therefrom.

10. In a device for use in calibrating an air leakage type gage, first and second wall members; said first wall member having a flat metering surface; a passageway extending through said first wall member to said metering surface; means mounting said second wall member for pivotal movement around an axis at right angles to said metering surface; the second wall member having two flat surface sections facing the metering surface at different distances therefrom.

11. The combination of claim 10 wherein the pivot means includes a headed pin extended through the second wall member into the first wall member; there being resilient means between the head and second wall member.

12. The combination comprising a float chamber; a float calibrator downstream from the float chamber; and a gaging element in fluid communication with said float chamber; said calibrator comprising first and second wall members having opposed fluid metering surfaces of known spacing; a passageway extending from the metering surface of the first wall member into fluid communication with the float chamber; and means for closing the passageway so as to put the fluid metering surfaces out of fluid communication with the float chamber.

13. The combination comprising a float chamber; a first wall member having a passageway therethrough; a gaging element; first conduit means connecting the outlet of the float chamber with one end of the passageway; second conduit means connecting the other end of the passageway with the gaging element; a second wall member; said wall members having opposed fluid metering surfaces of known spacing; and a second passageway extending through the first wall member from its metering surface to the first passageway.

14. The combination comprising a float chamber; a first wall member having a passageway therethrough; a gaging element; first conduit means connecting the outlet of the float chamber with one end of the passageway; closable conduit means connecting the other end of the passageway with the gaging element; a second wall member; said wall members having opposed fluid metering surfaces of known spacing; and a second passageway extending through the first wall member from its metering surface to the first passageway.

References Cited in the file of this patent

UNITED STATES PATENTS

| | | |
|---|---|---|
| 1,103,882 | Kidder | July 14, 1914 |
| 1,786,330 | Berkeley | Dec. 23, 1930 |
| 1,971,271 | Mennesson | Aug. 21, 1934 |
| 2,558,683 | Hart | June 26, 1951 |
| 2,572,950 | Rider | Oct. 30, 1951 |
| 2,593,957 | Aller | Apr. 22, 1952 |
| 2,790,320 | Salko et al. | Apr. 30, 1957 |
| 2,861,451 | Emmons | Nov. 25, 1958 |